United States Patent [19]

Kamiyama et al.

[11] Patent Number: 5,082,162
[45] Date of Patent: Jan. 21, 1992

[54] METHODS FOR SOLDERING SEMICONDUCTOR DEVICES

[75] Inventors: Satoshi Kamiyama, Kawanishi; Kiyoshi Ohnaka, Moriguchi, both of Japan

[73] Assignee: Matsushita Electric Industrial Co., Ltd., Kadoma, Japan

[21] Appl. No.: 650,695

[22] Filed: Feb. 5, 1991

[30] Foreign Application Priority Data

Feb. 5, 1990 [JP] Japan ..................... 2-26463

[51] Int. Cl.$^5$ ..................... B23K 35/22; B23K 1/002
[52] U.S. Cl. ..................... 228/123; 228/253; 437/183; 437/190; 437/902
[58] Field of Search ..................... 228/253, 123, 263.12; 526/255; 437/190, 212, 902, 183

[56] References Cited

U.S. PATENT DOCUMENTS

| 2,468,664 | 4/1949 | Hanford | 526/255 |
| 4,142,662 | 3/1979 | Holbrook et al. | 228/253 |
| 4,311,727 | 1/1982 | Lazzari | 437/190 |
| 4,380,862 | 4/1983 | Nyul | 437/902 |
| 4,677,175 | 6/1987 | Ihara et al. | 526/255 |
| 4,684,055 | 8/1987 | Baer et al. | 228/248 |
| 4,796,082 | 1/1989 | Murakami et al. | 437/190 |

FOREIGN PATENT DOCUMENTS

62-128133  6/1987  Japan ..................... 437/212

Primary Examiner—Richard K. Seidel
Assistant Examiner—Jeanne M. Elpel
Attorney, Agent, or Firm—Ratner & Prestia

[57] ABSTRACT

This invention presents a new soldering material comprising an indium layer formed on EFTE film for solder-mounting a semiconductor device onto a metal heat sink. This indium layer can be easily transferred onto the heat sink by pressure applied by a tool, without the aid of ultrasonic energy. This produces a highly immaculate surface of the indium layer transferred onto the heat sink, and achieves stable soldering strength of the soldered semiconductor device. This invention also offers a multi-layered soldering material comprising a thin layer of metal of which the melting point is higher than the soldering temperature, and two indium layers sandwiching said metal layer, formed on an EFTE film. This multi-layered soldering material can be easily transferred onto a metal heat sink by a pressure applying tool without the aid of ultrasonic energy resulting in the stable soldering of a semiconductor device even if it has surface irregularities, without causing an electrical leakage or short circuit.

3 Claims, 9 Drawing Sheets

PRIOR ART

PRIOR ART

*Fig. 11*

PRIOR ART

*Fig. 12*

PRIOR ART

*Fig. 13*

| | TEFLON | FEP | PFA | POLYIMIDE | ETFE |
|---|---|---|---|---|---|
| TENSILE STRENGTH (kg/cm$^2$) | 140~350 | 190~220 | 300 | 665~875 | 460 |
| MODULUS OF FLEXURAL ELASTICITY (kg/cm$^2$) | 3.5~6.3 | 6.7 | 6.7 | 1120~1330 | 14.0 |
| STRUCTURAL FORMULA | $\left(\begin{array}{cc}F & F \\ -C-C- \\ F & F\end{array}\right)_n$ | $\left(\begin{array}{cccc}F & F & F & F \\ -C-C-C-C- \\ F & F & F & CF_3\end{array}\right)_n$ | $\left(\begin{array}{cccc}F & F & F & F \\ -C-C-C-C- \\ F & F & F & O \\ & & & Rf\end{array}\right)_n$ | [polyimide structure] | $\left(\begin{array}{cccc}F & F & H & H \\ -C-C-C-C- \\ F & F & H & H\end{array}\right)_n$ |

METHODS FOR SOLDERING SEMICONDUCTOR DEVICES

BACKGROUND OF THE INVENTION

This invention relates to materials and methods for soldering semiconductor devices developed for optical communication and optical information process applications.

In response to the demand for increasing semiconductor laser applications, significant developments of GaAs and InP system laser devices in the fields of crystal growth, processing, and packaging technologies have been accomplished. Among these, the advancement of packaging technology contributed significantly to reduce its cost and to improve the overall performance and reliability as those laser devices are mass-produced.

Figure 8:
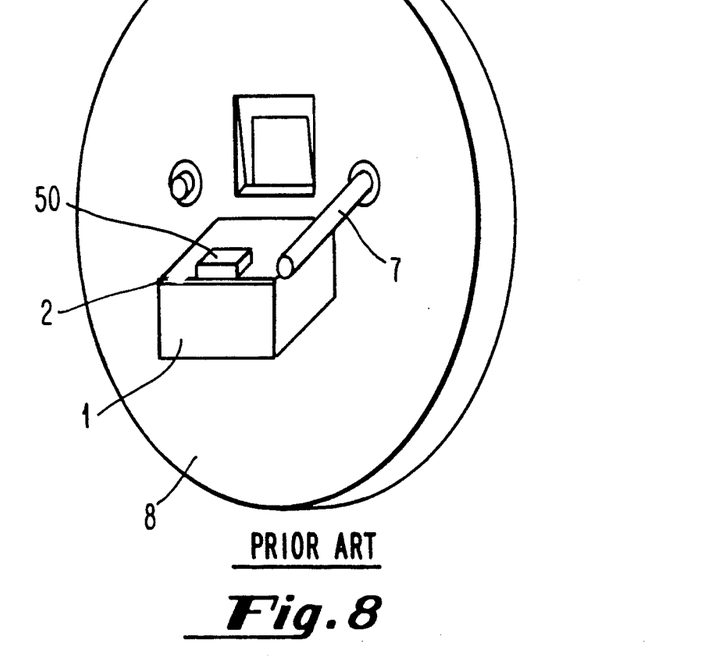
FIG. 8 is a perspective view of an arrangement of conventional (prior art) direct bonding.

In order to reduce their thermal resistance, optical semiconductor devices such as a semiconductor laser device are conventionally packaged by a construction shown in FIG. 8 wherein 1 is a heat-sink made of a high thermal-conductivity material such as copper, and 2 is a soft metal-solder such as indium, employed to relieve mechanical stress caused by a difference between respective thermal expansion coefficients of semiconductor device 50 and heat sink 1.

This packaging method is referred to as a direct bonding method, and in this manner, a low thermal resistance on the order of 40°C/W can be easily obtained when a semiconductor laser is solder mounted on a heat sink.

Figure 9:
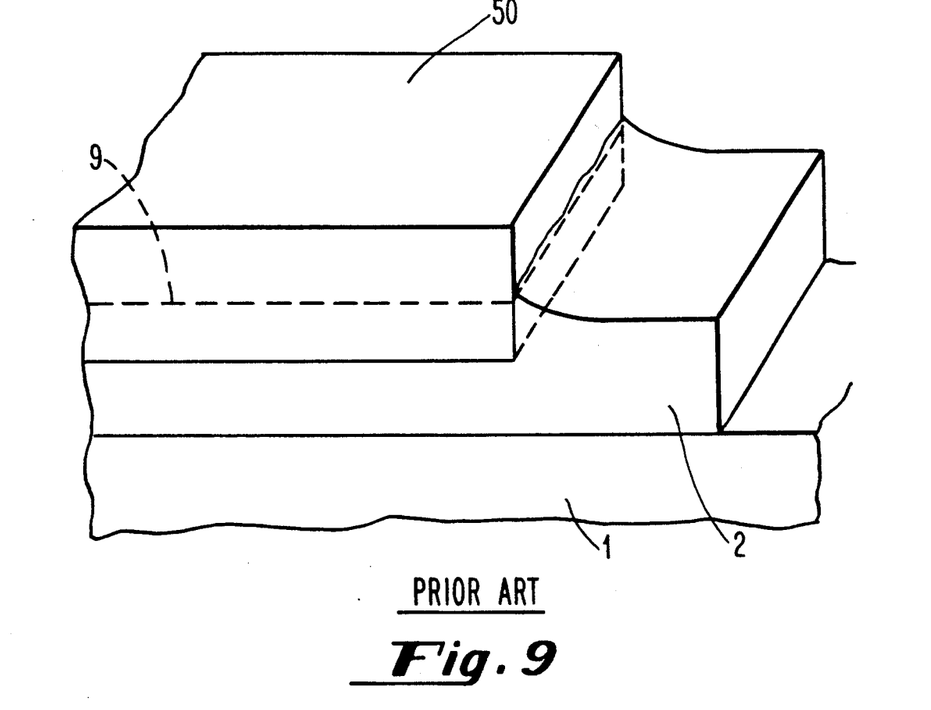
FIG. 9 is a perspective cross-sectional view of an electrical fault caused by an excessive thickness of a conventional (prior art) soldering layer.

However, this direct bonding method calls for a highly controlled thickness and flatness of the indium solder layer. This means that the bonding strength could be inadequate if the solder layer is too thin. If the solder layer is too thick, electrical short-circuit or leakage could occur by creeping of indium solder layer 2, which may cause bridging of the pn-junction 9 exposed on a side of semiconductor device 50 as shown in FIG. 9.

Furthermore, if there are any irregularities on the surface of indium solder layer 2, inadequate soldering of semiconductor device 50 on a heat sink 1 would result due to a possible gap which tends to inhibit the heat transfer between semiconductor device and heat sink 1. Therefore, in order to solve these problems, the indium layer 14 has to be formed by vacuum deposition for attaining an exact thickness of 2 to 3 microns.

However, the heat sink on which the indium deposition has to be made is integrated with a stem 8. Any part which should be excluded from the indium deposition, such as a wiring post 7, has to be individually masked, and this complicates the production process considerably.

Figure 10:
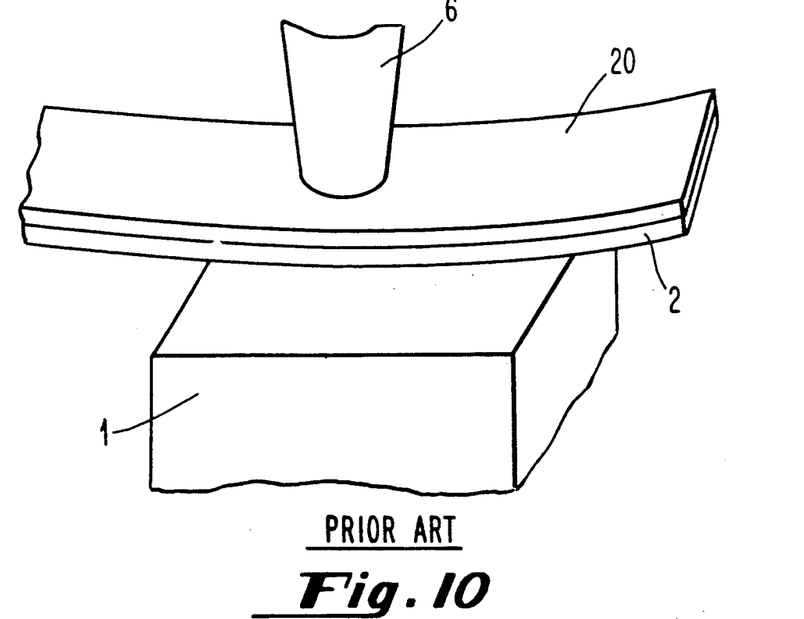
FIG. 10 is a perspective view of one step of a transfer process when a conventional (prior art) semiconductor-device soldering material is employed.
Figure 11:
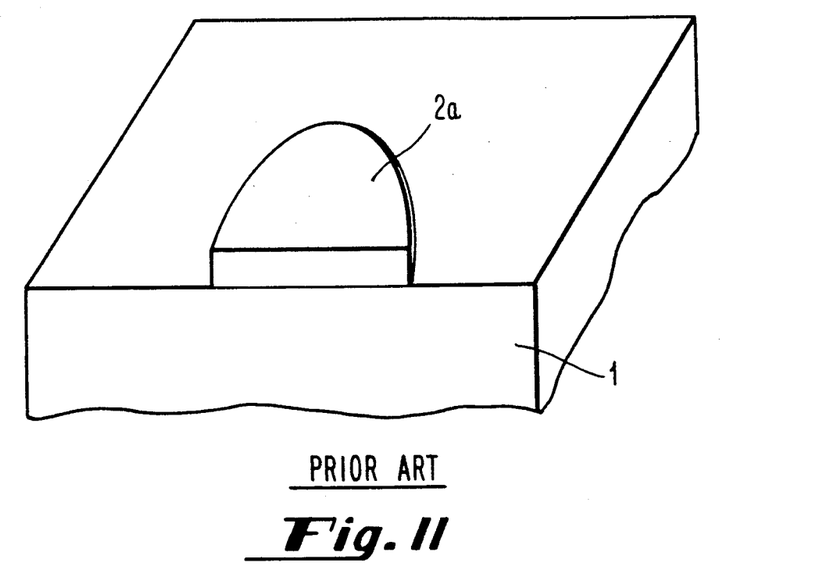
FIG. 11 is a perspective view of conventional (prior art) soldering material after it is transferred onto a heat sink.

In order to solve these problems, a method of forming solder layer 2 shown in FIG. 10 was previously disclosed by the Japanese Laid-Open Patent Sho 62-143496. According to the disclosed method, the indium layer 2 is formed first on a film 20, and in order to transfer this indium layer onto a heat sink, this layer is pressed against a preheated heat sink 1 by applying a pressure force and ultrasonic energy produced by a tool 6 from the reversed side of the film 20 as shown in FIG. 10. This method contributed considerably to simplifying the required soldering process and to reducing the production costs.

Figure 12:
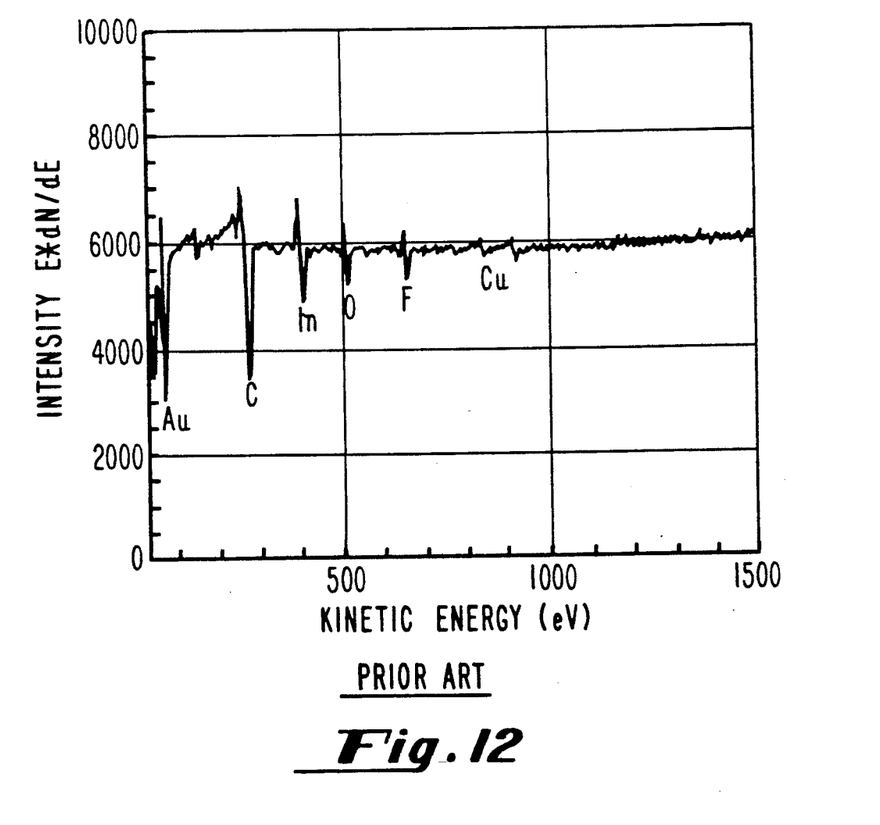
FIG. 12 is a graph of the result of AES analysis conducted on the surface of transferred conventional (prior art) soldering material.

Whereas the film employed in the above-described direct bonding method has to be Teflon ® (polytetrafluoroethylene) film because of its low flexural elastic constant and high mechanical durability under the applied ultrasonic energy used to melt the indium layer onto the heat-sink and to transfer it completely thereto, dissociation of carbon and fluorine from the Teflon surface is inevitable. This is proved by a result of Auger-Electron Spectroscopy (AES) as shown in FIG. 12, conducted on the surface of a transferred indium layer. The spectral peaks of carbon, fluorine, and other elements are attributable to those elements left on the transferred indium layer, and these are considered responsible for inadequate soldering strength.

Figure 13:
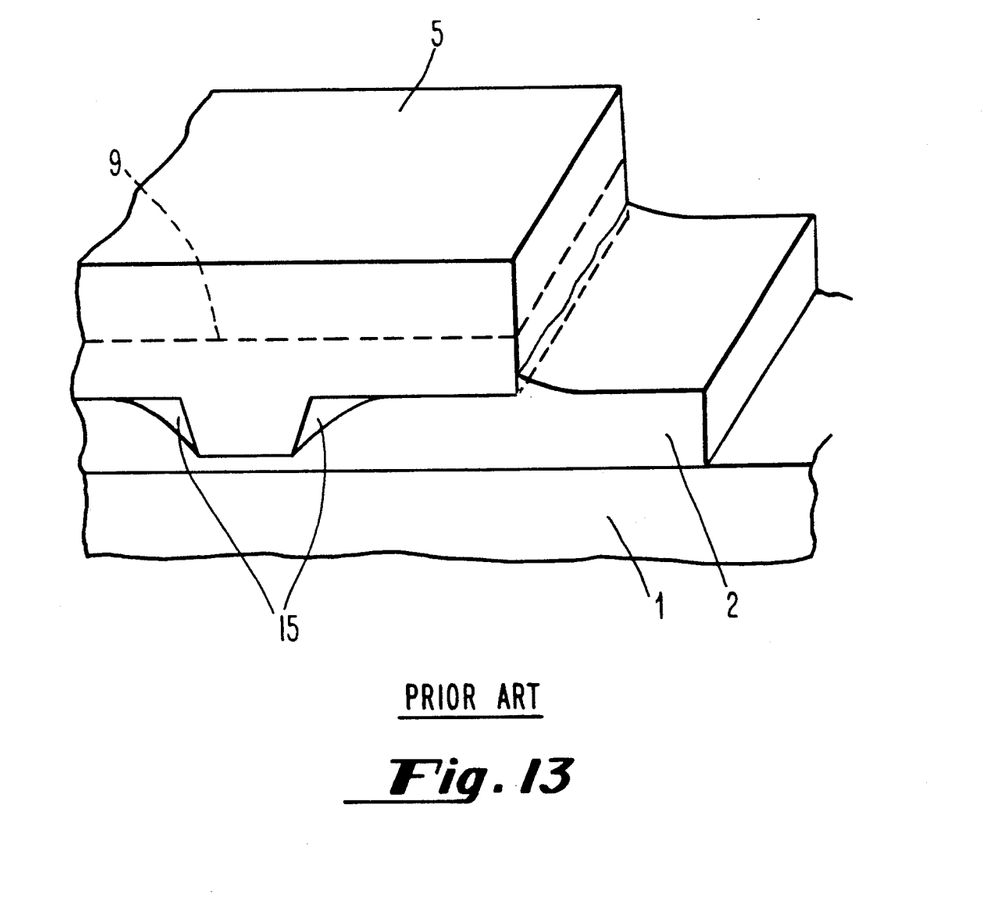
FIG. 13 is a perspective cross-sectional view of a soldered condition of semiconductor device having an irregular surface by using a conventional (prior art) soldering material.

Furthermore, with this direct bonding method, difficulties had been experienced in soldering a semiconductor device 5 having an irregular surface such as shown in FIG. 13. This is because gap 15, produced between semiconductor device 5 and heat sink 1 due to the irregular surface, can not be filled by thin indium layer 2 which has a thickness of 2 to 3 microns.

SUMMARY OF THE INVENTION

A first objective of the present invention is to offer a new semiconductor device soldering material developed to make the transfer of indium layer from the base film easier, to provide an immaculate surface of the transferred indium layer, and thus to secure a stable and high soldering strength.

A second objective of the invention is to offer a new semiconductor device soldering material which enables the soldering of a semiconductor device having an irregular surface without causing electrical short-circuit or leakage yet securing an high soldering strength.

A third objective of the invention is to offer a new semiconductor device soldering method by which the indium layer formed on the base film can be easily transferred onto a heat sink without using ultrasonic energy and without contaminating the surface of the transferred indium layer yet securing a stable soldering strength.

A fourth objective of the invention is to offer a new semiconductor device soldering method by which even a semiconductor device having an irregular surface can be soldered without causing electrical short-circuit or leakage yet securing a stable soldering strength.

In order to accomplish the first objective, an indium deposited film prepared by depositing an indium containing metal layer on a tetrafluoroethylene-ethylene copolymer film has been developed.

In order to accomplish the second objective, a multi-layered soldering material, comprised of a metal layer of which the melting point is higher than the soldering temperature, and two indium layers sandwiching said metal layer, formed on a tetrafluoroethyleneethylene copolymer film, is developed and employed.

In order to accomplish the third objective, a soldering method is developed by which the surface of an indium-deposited film prepared by depositing an indium-containing metal layer on a tetrafluoroethylene-ethylene copolymer film is placed against a metal base, and by applying pressure from the reverse side of said film by means of a pressure applying tool, transfer of said indium-containing metal layer onto the metal base surface is accomplished, and a semiconductor device is soldered on the metal base by means of said transferred indium-containing layer.

In order to accomplish the fourth objective, a soldering method is developed by which a multi-layered soldering material comprising a metal layer of which the melting point is higher than the soldering temperature, and two indium layers sandwiching said metal layer, formed on a tetrafluoroethylene-ethylene film, is placed on a metal base, and by applying pressure from the reverse side of said film by means of a pressure applying tool, said multi-layered soldering material is transferred on the metal base surface, and a semiconductor device having an irregular surface is soldered on the metal base by means of said transferred multi-layered soldering layer.

DETAILED EXPLANATION OF THE INVENTION

The reason why tetrafluoroethylene-ethylene (hereinafter this is abbreviated to EFTE) copolymer film has to be employed as the base film on which semiconductor device soldering material is formed, is described here first.

Teflon film had been employed as the base film on which conventional soldering material is formed as shown in Laid-Open Japanese Patent Sho 62-143496. However, in this case, a fair amount of ultrasonic energy had to be applied to transfer the indium layer which is a soldering material deposited on the Teflon film at the soldering, and this was inevitably accompanied by a transfer of impurity elements such as carbon and fluorine atoms from the film to the solder layer.

Since a satisfactory solder transfer can not be executed because of poor transmission of pressure applied from the reverse side of film if a thicker base film is used, the film thickness should be as thin as possible but it should be provided with an adequate tensile strength in order to avoid possible film elongation under tension.

Therefore, four copolymers, including tetrafluoroethylene-hexafluoropropylene (FEP), tetrafluoroethylene-perfluoro-alkylvinylether (PFA), tetrafluoroethylene-ethylene (EFTE) copolymer films, and polyimide film which is a thermoplastic resin, have been tested for this purpose.

Figure 14:
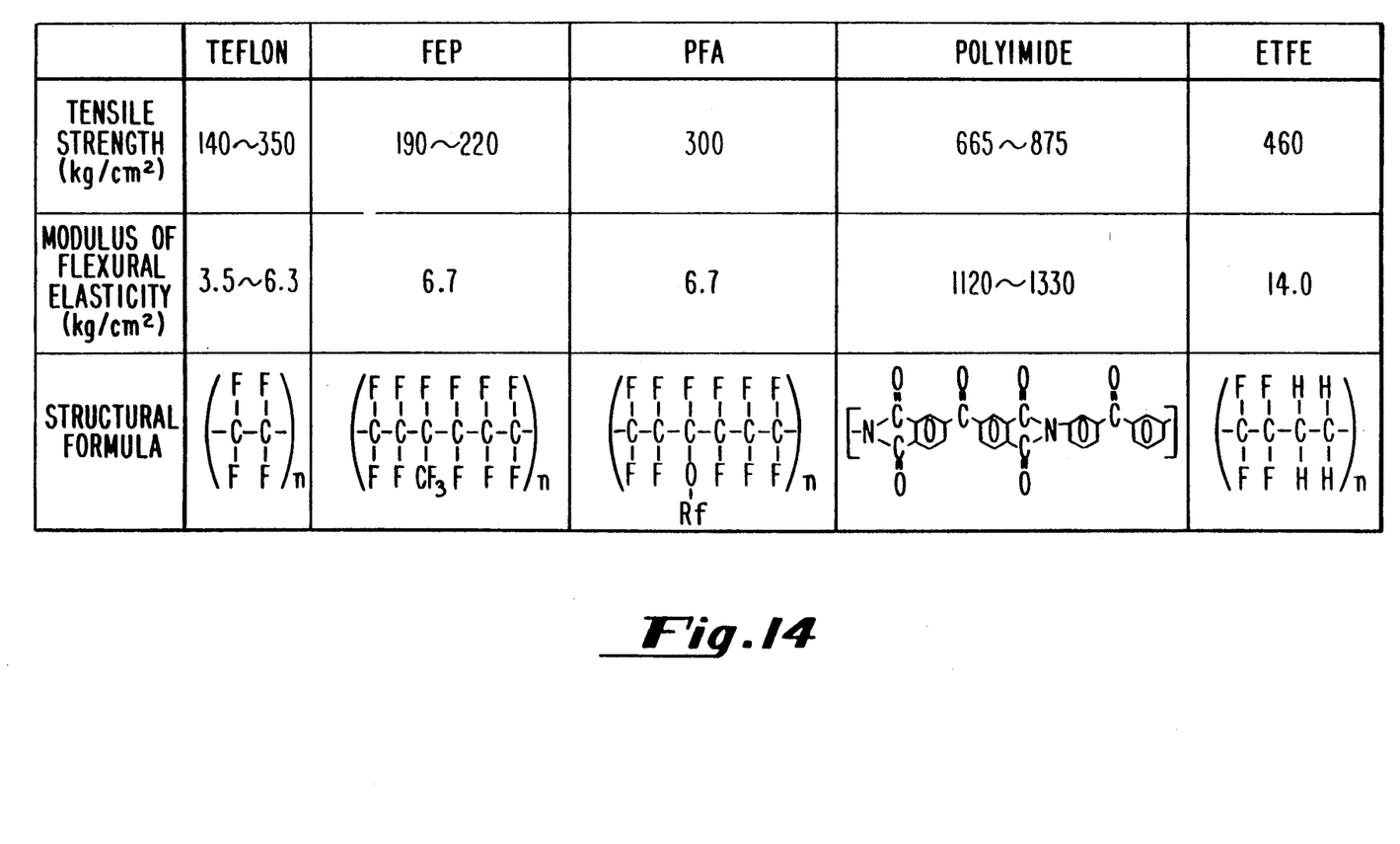
FIG. 14 is a chart of comparative characteristics and chemical formulas of various films.

FIG. 14 is a comparative list of the physical characteristics and chemical formulas of these copolymers and Teflon. Since the highest durable temperatures of these are higher than the soldering temperature, there should be no problems in soldering.

Experimental Result 1: Experiments were conducted wherein FEP and PFA films were used as follows. A cross-section of the indium layer transferred on a heat sink under pressure by application of a tool is shown in FIG. 15.

This shows a severe warp of film 21 at the edge of the area at which the pressure is applied. Although a pressure proportional to the shape of tool was applied to the surface of the film, this pressure could not be exactly transmitted to the reverse side of the film by which a contact on the heat sink was made, and a warping of the film took place due to an internal pressure loss caused by the low flexural elastic constant of the film.

Figure 15:
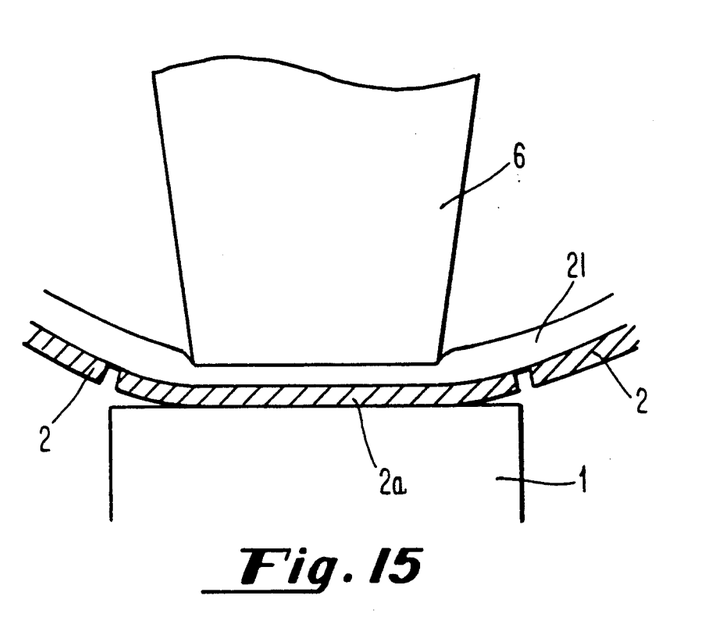
FIG. 15 is a cross-sectional view of one step of a transferring process using FEP (tetrafluoroethylenehexafluoropropylene) or PFA (tetrafluoroethyleneperfluoro-alkylvinylether) film.

Since the indium layer could not be cut off sharply at the tool edge due to this warping effect, a transfer of excessive amounts of the indium layer took place as shown in FIG. 15. This phenomena is attributable to the tensile strength and flexural elastic constant of the transferring material which are of the same order as those of Teflon. It was found also that such a phenomenon was not observed if ultrasonic energy was also applied to the tool.

Figure 16:
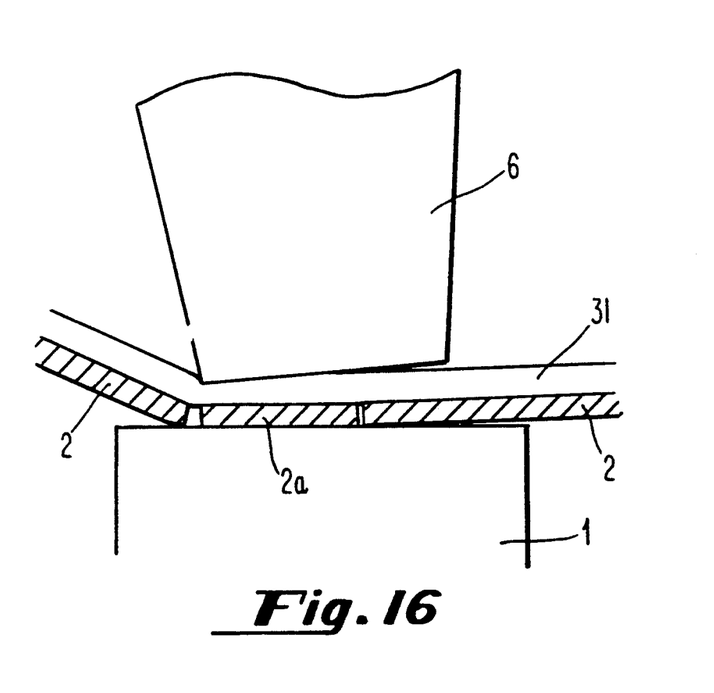
FIG. 16 shows is a cross-sectional view of one step of a transferring process using polyimide film.

Experimental Result 2: Based on the result of Experimental Result 1, an experiment was conducted wherein polyimide film, having a higher tensile strength and flexural elastic constant, was used as a base film, and this result is shown in FIG. 16.

Since polyimide is a thermoplastic resin having a higher stiffness, the pressure applied by the tool was transmitted exactly to the reverse side of the film 31. However, if there existed any mechanical play in the transferring machine, and the top surface of the tool and the heat sink surface were not parallel, only a local transfer of soldering material at an area on which the tool made direct contact took place since the pressure applied by the tool was partly lost in the film.

Experimental Result 3: Based on Experimental Results 1 and 2, an experiment was conducted wherein EFTE film having a tensile strength and flexural elastic constant higher than those of Teflon was used as a base film, and this result is shown by the following three embodiments of the invention.

Figure 1:
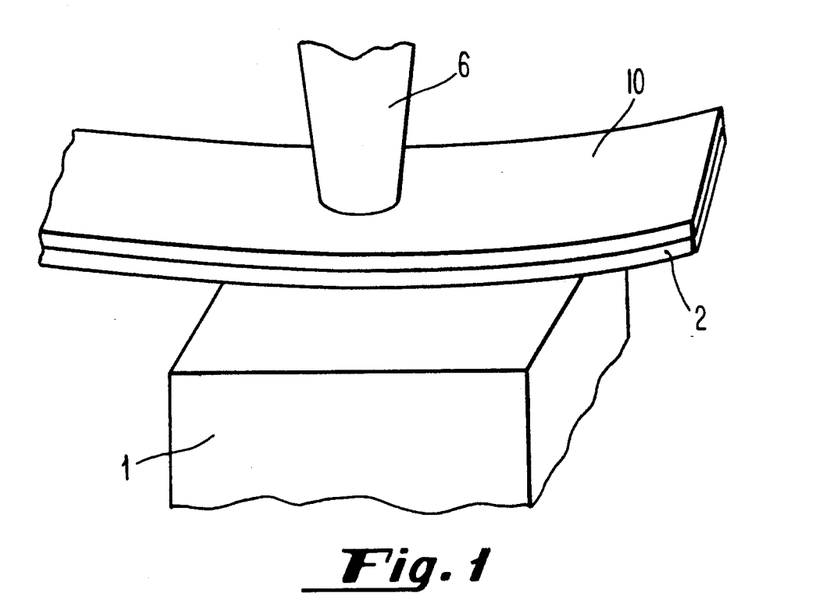
FIG. 1 is a perspective view of one step of a process of the present invention to transfer soldering material formed on a film onto a heat sink.
Figure 2:
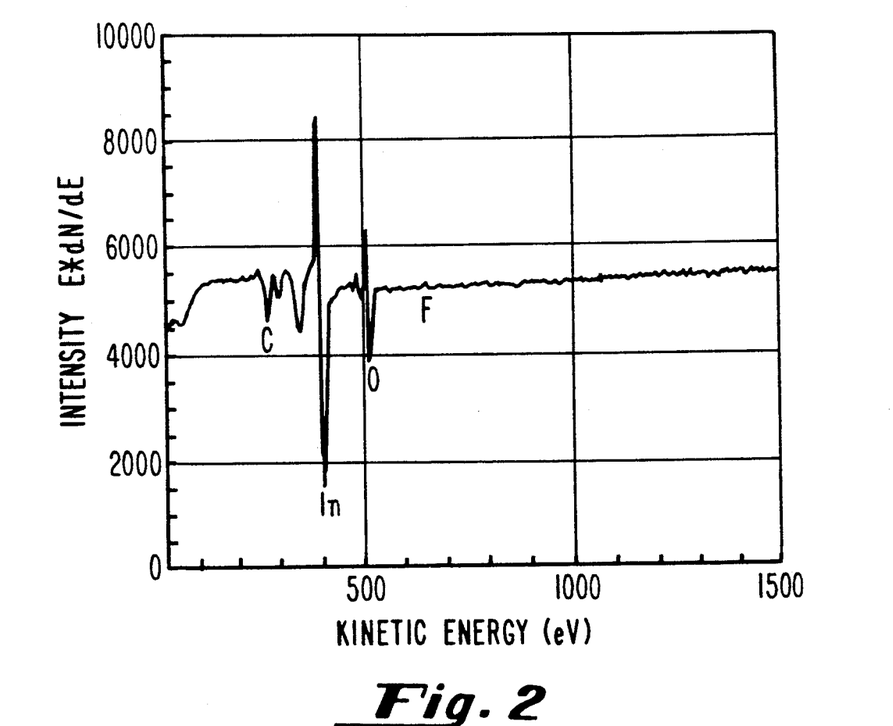
FIG. 2 is a graph of the result of AES (Auger Electron Spectroscopy) analysis conducted on the surface of transferred soldering material of the invention.

A first embodiment of semiconductor-device soldering material of the invention is shown in FIG. 1 where 2 is an indium layer vacuum deposited on a 50 micron thick EFTE film 10 at a thickness of two microns. By pressing this indium layer against a heat sink and by applying only pressure from the reverse side of EFTE film, exact transfer of indium onto the heat sink can be easily accomplished without assistance of ultrasonic energy. Moreover, an immaculate indium surface, without traces of carbon or fluorine, is attainable as shown in FIG. 2 which is a graph of the result of AES analysis on the transferred indium layer.

The traces of carbon or fluorine elements found on the indium layer transferred under an application of ultrasonic energy can be attributed to the local dissociation of fluoroic copolymer, including all materials tested, which is apt to be dissociated at an elevated temperature.

In contrast to the case of Teflon, since EFTE has a proper elastic constant, the transfer of the indium layer was easily accomplished without producing the above-identified problems and without applying ultrasonic energy in this embodiment of the invention.

Figure 3:
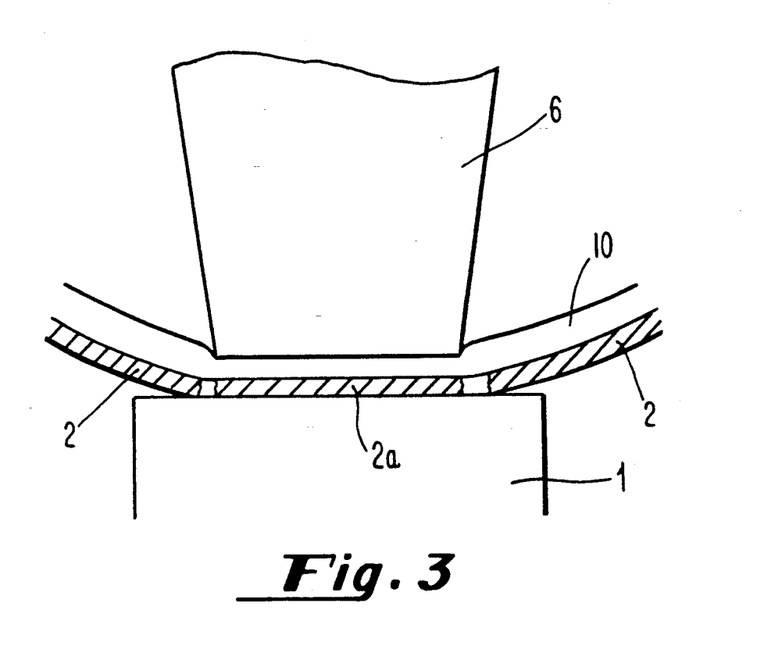
FIG. 3 is a cross-sectional view of one step of a transferring process of the invention.

As a second embodiment of the invention, a semiconductor-device soldering method of the invention is shown next in FIG. 3. By this method, a soldering material consisting of EFTE film on which indium was vacuum deposited was used. By applying an acceleration of about 0.5 m/sec$^2$ and a static pressure of 300 grams on a tool 6 having a circular top area of $5 \times 10^{-2}$cm$^2$ from the reverse side of the film 10, the soldering material was pressed against a heat sink 1 kept at a temperature of 80° C. as shown in FIG. 3.

Figure 4:
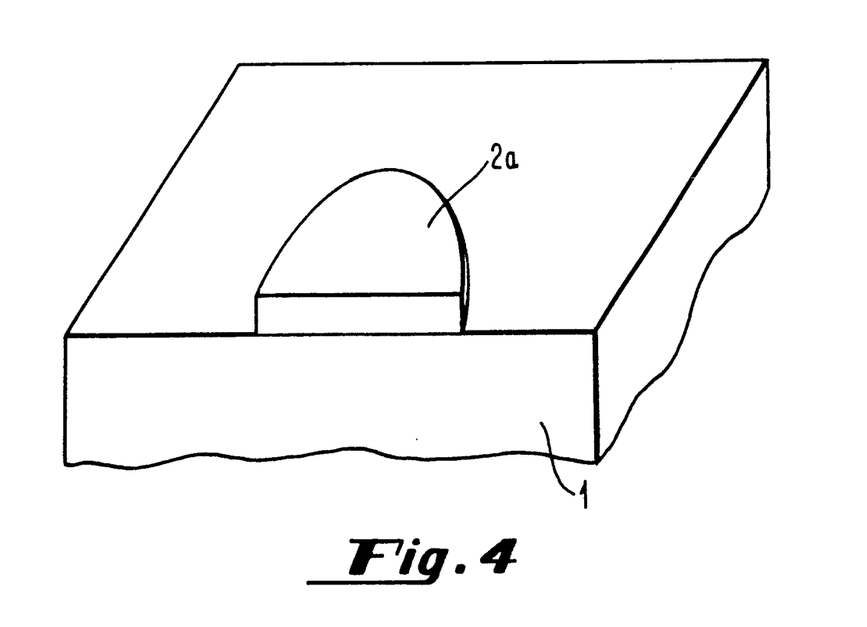
FIG. 4 is a perspective view of the transferred soldering material of the invention.

In this case, the EFTE film 10 was deformed by a shock and stress exercised by the tool 6, causing a stretch and detachment of indium layer 2 and its succeeding transfer on the heat sink 1. FIG. 4 shows the indium layer 2a layer transferred in a shape of the tool-top. Although acceleration and static pressure forces suitable for the employed tool are specified, transfer of larger indium areas is possible by altering these values.

It is needless to say that this invention is applicable to cases where soldering material is of multilayered construction containing material other than indium.

As above described, an immaculate surface of the indium layer, transferred without using ultrasonic energy application, can be obtained by using a soldering material comprised of several soldering metal layers including an indium layer formed on an EFTE film.

Figure 5:
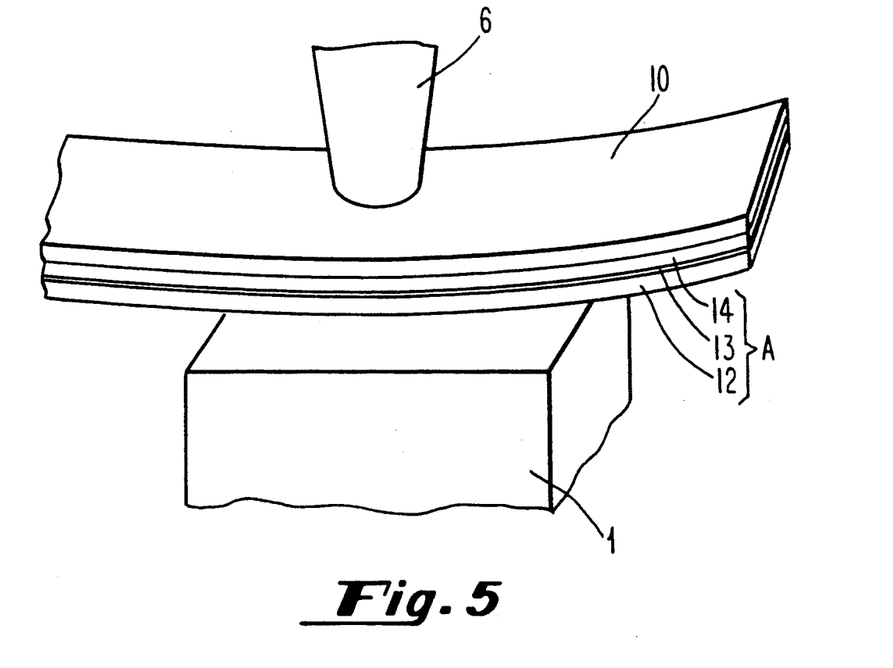
FIG. 5 is a perspective view of one step of a transfer process using the soldering material of the invention.

A third embodiment of the invention is shown by semiconductor device soldering material A shown in FIG. 5 wherein 12 is a first indium layer, 13 is a gold layer, and 14 is a second indium layer which were deposited on an EFTE film 10 at thicknesses of 4, 0.5, and 2 microns respectively. Indium layer 14 is deposited first, then gold layer 13, and indium layer 12.

Figure 6:
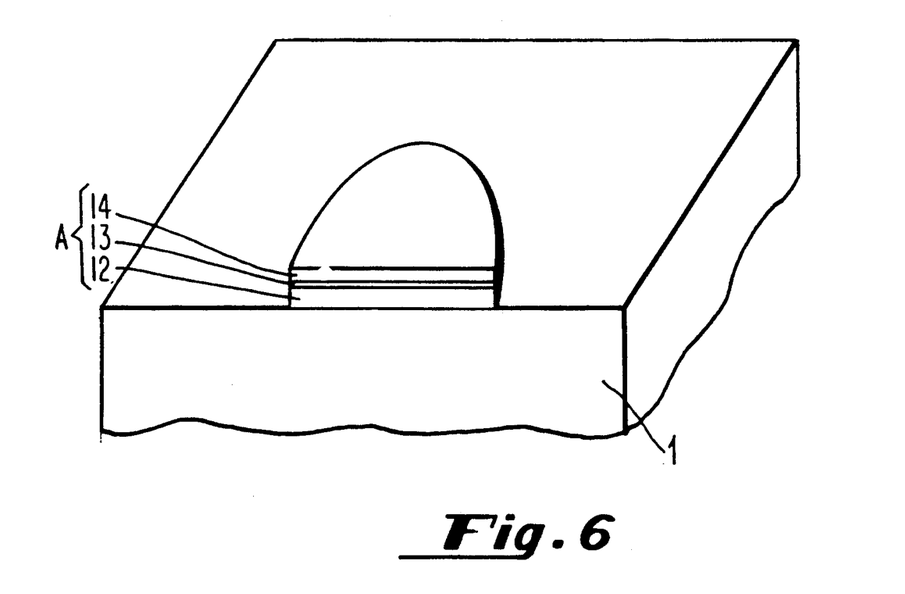
FIG. 6 is a perspective view of soldering material of the invention after it is transferred onto a heat sink.
Figure 7:
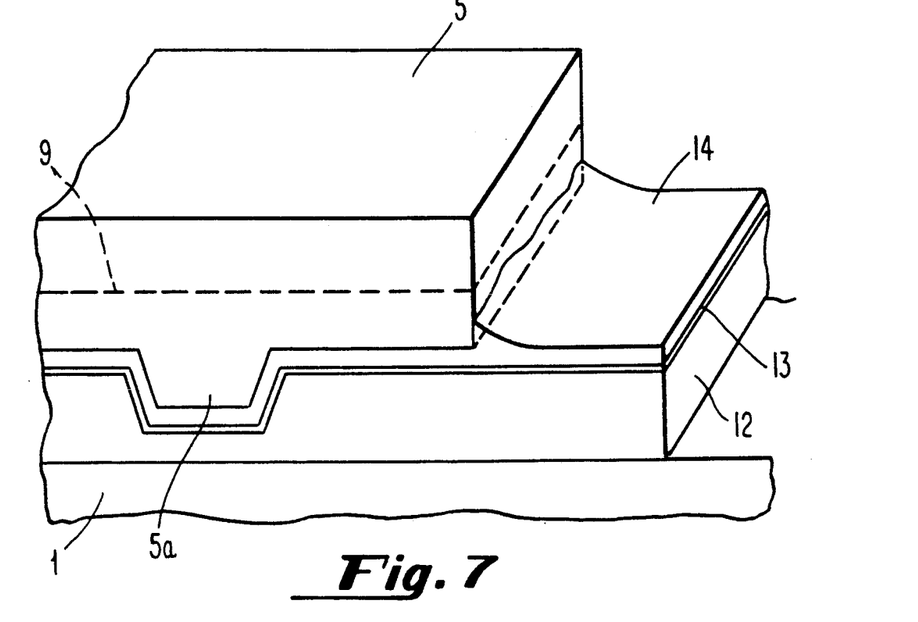
FIG. 7 shows is a perspective cross-sectional view of a semiconductor device having an irregular surface on which soldering is made in accordance with the present invention.

FIG. 6 shows the transferred soldering material shown in FIG. 5, and this shows a transferred soldering layer having a clearly defined shape of the tool-top by which the tool pressure was applied. In FIG. 7, although a ridge-stripe 5a having a height of 3 microns exists on the soldering surface of a semiconductor device 5, the effect of this ridge-stripe 5a is negated by deformation of the first indium layer 12.

Although the gold layer 13 is also deformed according to the surface irregularity of the semiconductor device 5, no melting or breakage of it takes place at the soldering temperature. Therefore, the first indium layer 12 and the second indium layer 14 are independently deformed, and the thickness of the second indium layer can be maintained as shown in FIG. 7. This prevents possible creeping of excessive indium on the side of semiconductor device 5 which causes possible electrical leakage or short-circuit.

Moreover, since adequate thickness of molten indium can be secured by this multi-layered construction of soldering material A, surface irregularities of semiconductor device 5 can be easily absorbed, resulting in perfect soldering on the heat sink.

Although a gold layer 3 is used as an intermediate layer here, any metal layer of which the melting point is higher than that of the soldering layer, such as platinum or silver, can be employed as well for this purpose.

As described above, even in the case where a semiconductor device having a surface irregularity is to be soldered on a heat sink, it can be easily accomplished by using the soldering material of the invention. Thus the soldering process can be substantially simplified, and low thermal resistance and high reliability of soldered semiconductor devices can be realized.

What is claimed is:

1. A semiconductor-device soldering method comprising:
    placing a surface of a soldering material comprising, an indium-containing metal layer formed on a tetrafluorethylene-ethylene copolymer film, against a metal base;
    transferring said metal layer of the soldering material onto said metal base by applying a pressure on the reverse side of said film by means of a pressure applying tool; and
    a pressure on the reverse side of said film by means of a pressure applying tool; and
    metal base by means of said transferred metal layer.

2. A semiconductor-device soldering method comprising:
    placing a primary surface of a multi-layered soldering material comprising, a metal layer of which the melting point is more than the soldering temperature, and two indium-containing layers sandwiching said metal layer, formed on a tetrafluoroethylene-ethylene copolymer film, against a metal base;
    transferring said multi-layered, metal layer formed on said primary surface of soldering material by applying a pressure on the reverse side of said film by means of a pressure applying tool; and
    soldering a semiconductor device onto said metal base by means of said transferred metal layer.

3. A semiconductor-device soldering method according to claim 1 or claim 2 wherein said indium-containing metal layer is formed by vacuum deposition.

* * * * *

UNITED STATES PATENT AND TRADEMARK OFFICE
CERTIFICATE OF CORRECTION

PATENT NO. : 5,082,162
DATED : January 21, 1992
INVENTOR(S) : Satoshi Kamiyama and Kiyoshi Ohnaka It is certified that error appears in the above—identified patent and that said Letters Patent is hereby corrected as shown below:

Column 6, line 41 (Claim 1), after "and" insert, as a new line,

--soldering a semiconductor device onto said--.

Signed and Sealed this

Twenty-fifth Day of May, 1993

Attest:

MICHAEL K. KIRK

Attesting Officer

Acting Commissioner of Patents and Trademarks